Dec. 4, 1928.
P. E. BRENEMAN
1,693,836
VEHICLE BODY
Filed May 21, 1920    5 Sheets-Sheet 1
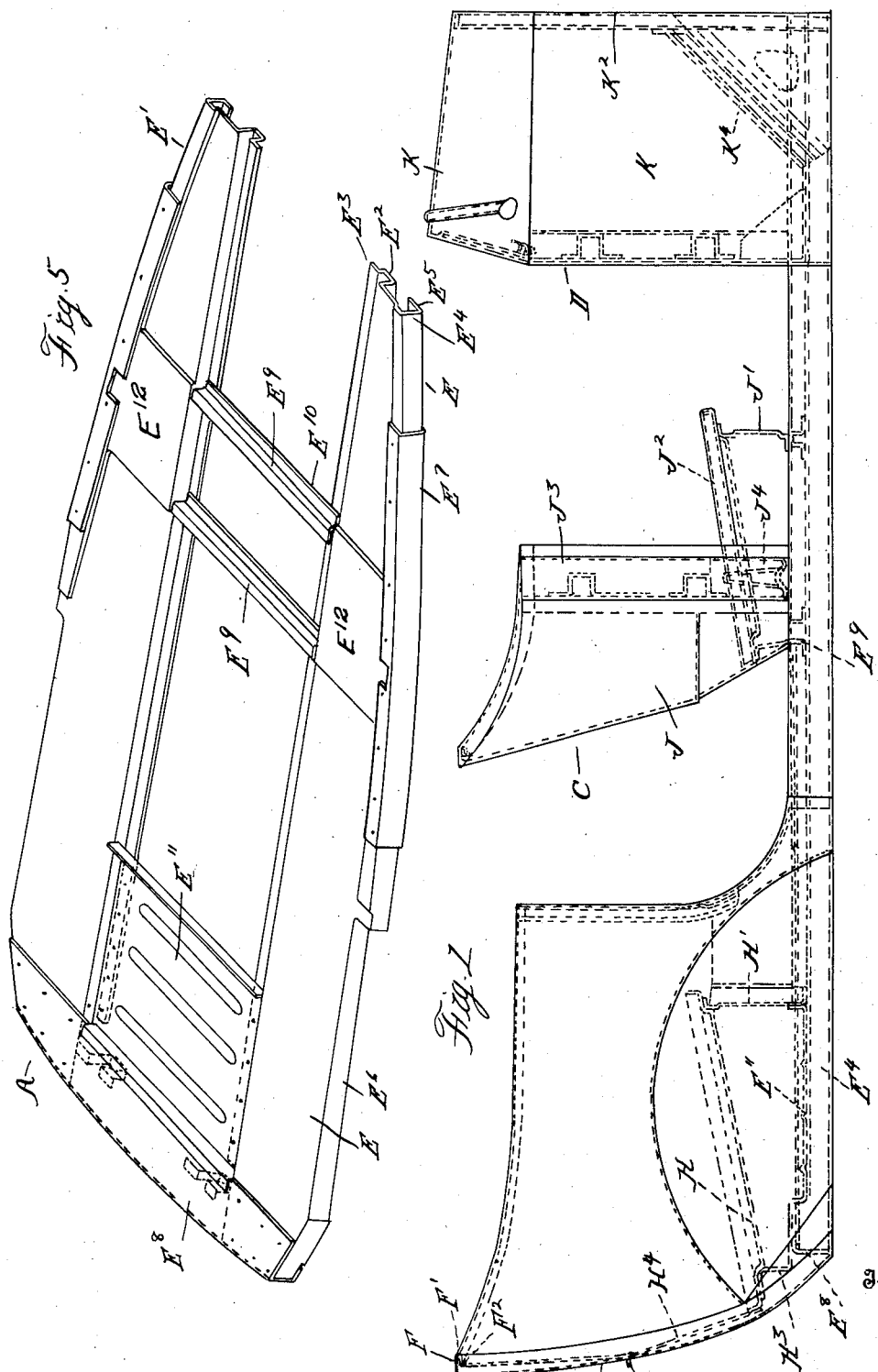

Dec. 4, 1928.　　　　　　　　　　　　　　　1,693,836
P. E. BRENEMAN
VEHICLE BODY
Filed May 21, 1920　　　5 Sheets-Sheet 2
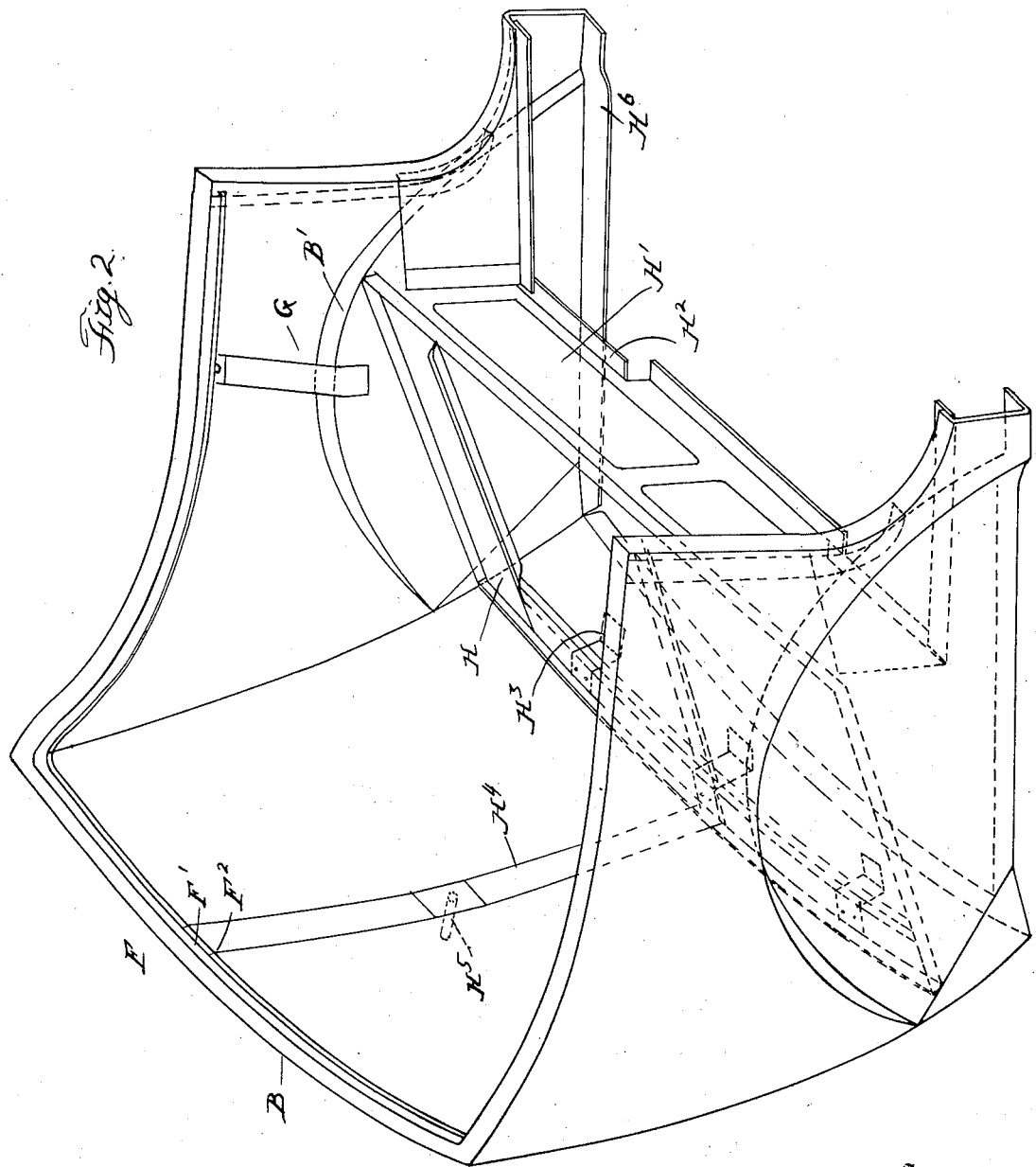
Inventor
Paul E. Breneman
By Whittemore Hulbert + Whittemore
Attorneys Dec. 4, 1928.
P. E. BRENEMAN
1,693,836
VEHICLE BODY
Filed May 21, 1920   5 Sheets-Sheet 3
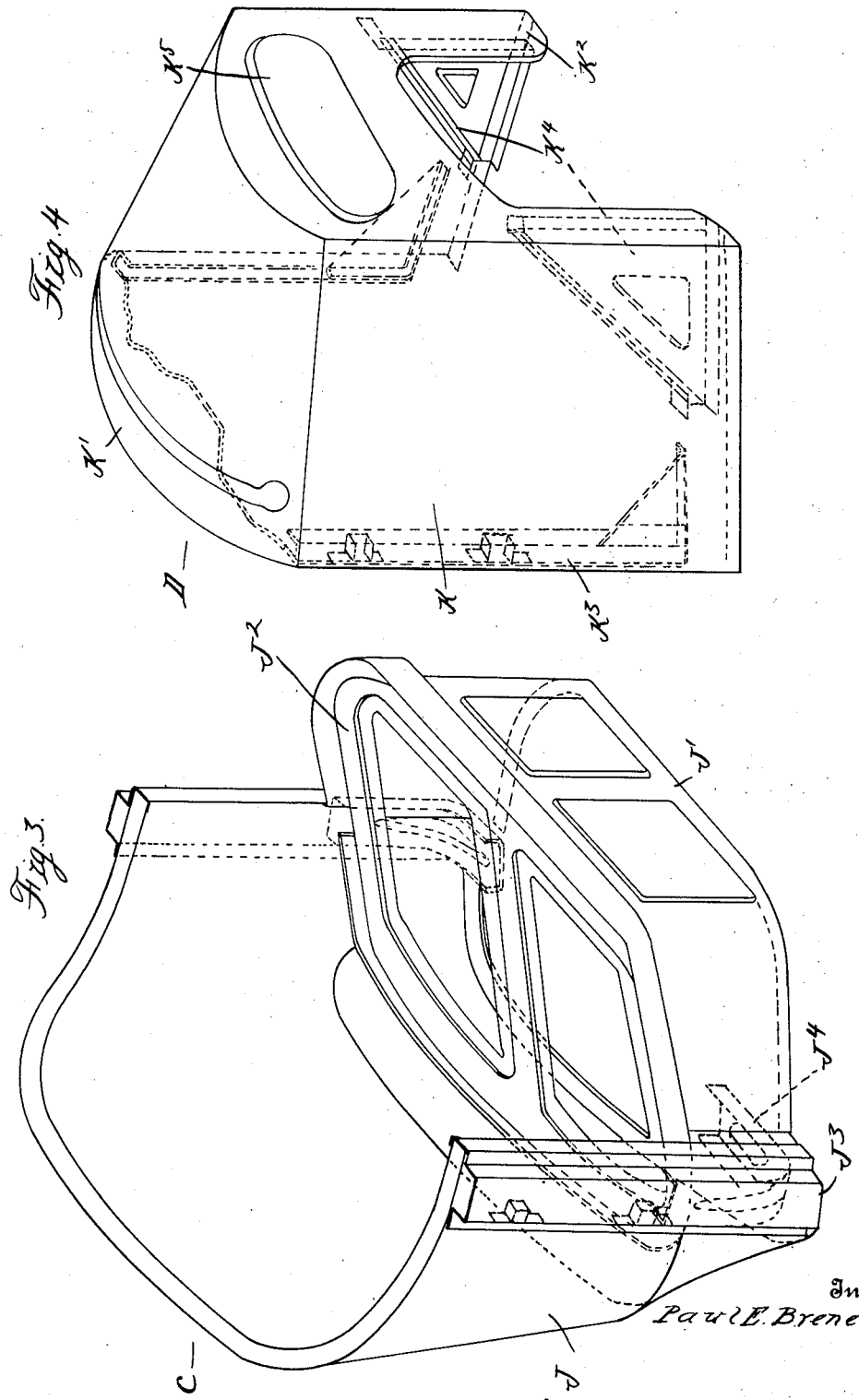
Inventor
Paul E. Breneman
By Whittemore Hulbert & Whittemore
Attorneys

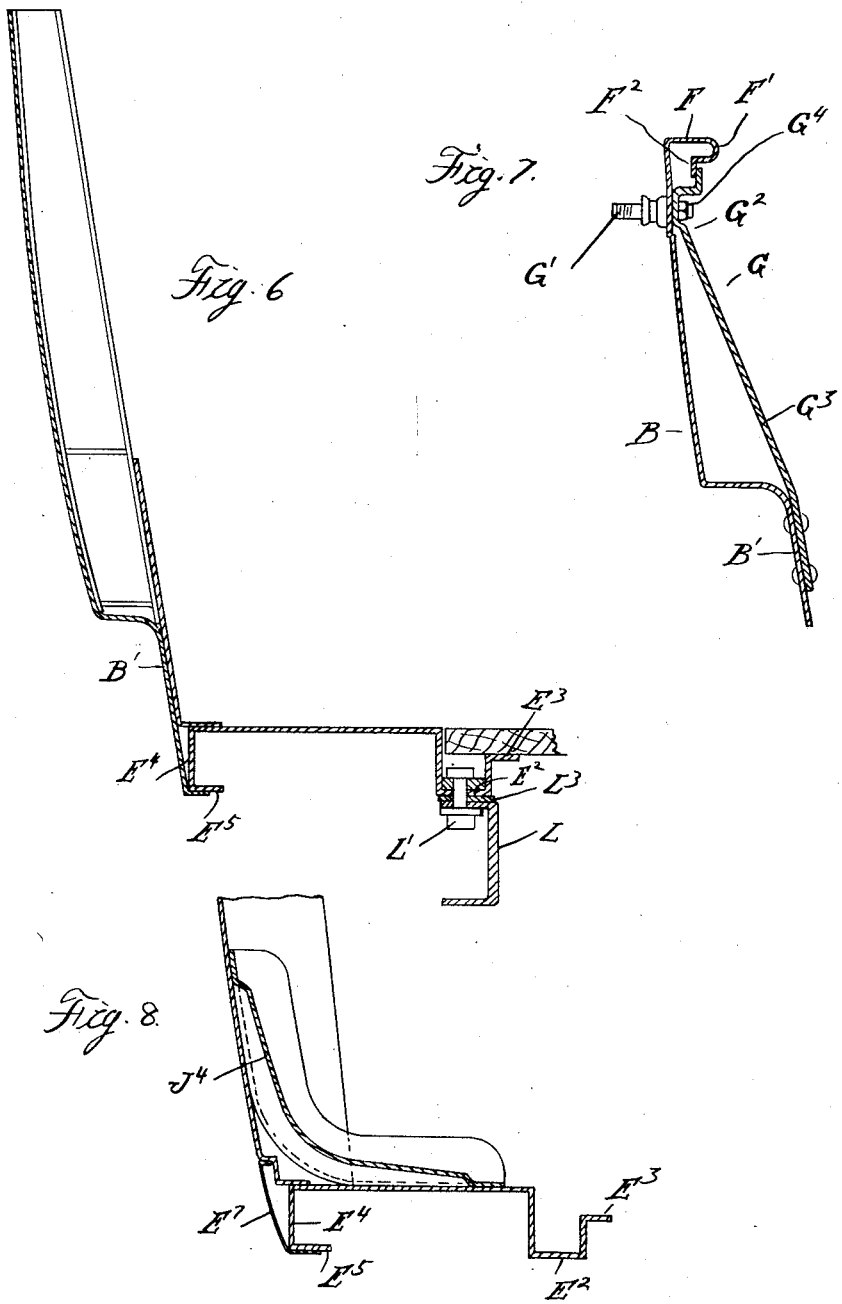

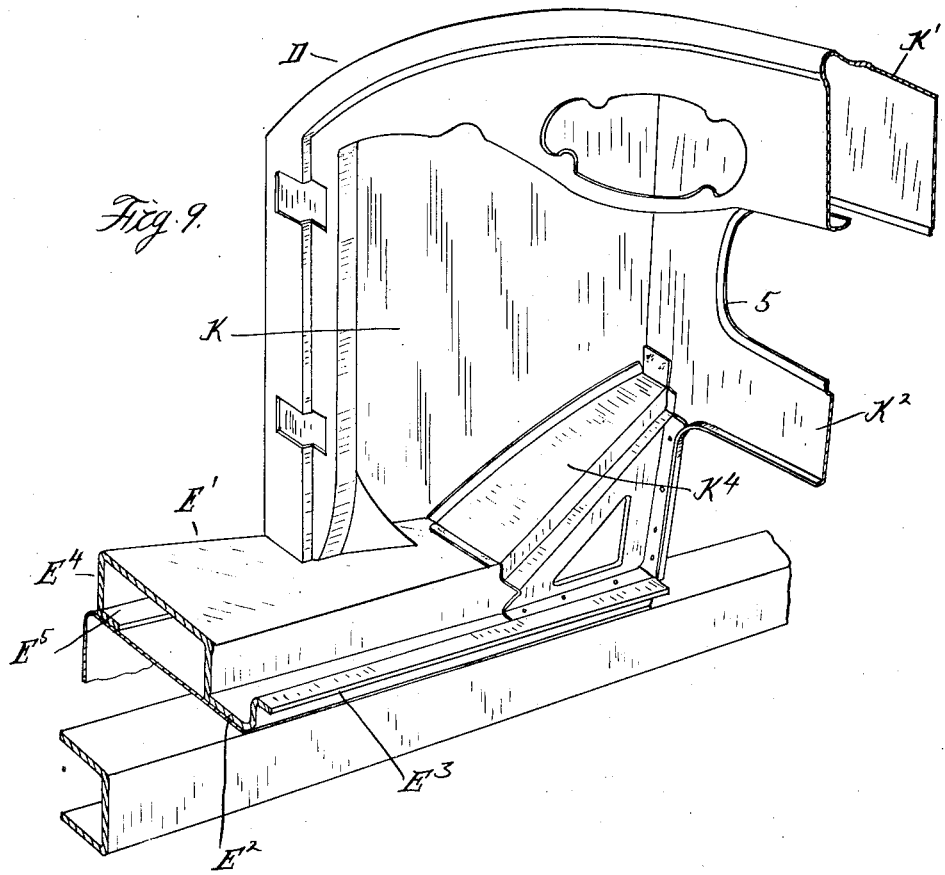
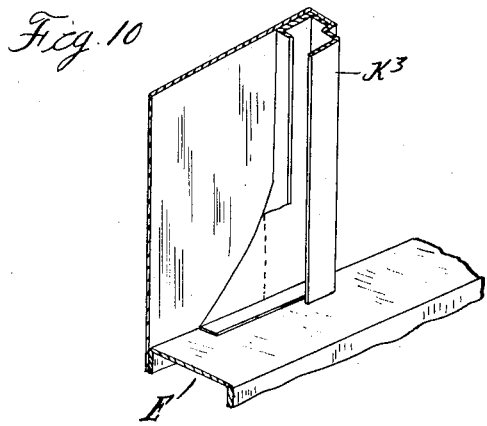

Patented Dec. 4, 1928.

1,693,836

UNITED STATES PATENT OFFICE.

PAUL E. BRENEMAN, OF DETROIT, MICHIGAN, ASSIGNOR TO C. R. WILSON BODY COMPANY, OF DETROIT, MICHIGAN, A CORPORATION OF MICHIGAN.

VEHICLE BODY.

Application filed May 21, 1920. Serial No. 383,299.

The invention relates to vehicle bodies of the all metallic type and the invention comprises various novel features of construction as hereinafter set forth.

In the drawings:

Figure 1 is a side elevation of the body without the doors;

Figures 2, 3, 4 and 5 are perspective views respectively of the tonneau unit, the front seat unit, cowl unit and the base or sill unit;

Figure 6 is a cross-section through the tonneau showing the manner of mounting the same on the chassis;

Figure 7 is a section through the tonneau in the plane of the top-supporting bracket;

Figure 8 is a cross-section through the door post of the front seat unit, showing the manner of securing the same to the base;

Figure 9 is a perspective view of a portion of the cowl unit secured upon the base unit;

Figure 10 is a similar view looking from the inside and showing the door post construction.

One of the features of my invention is the formation of the body in comparatively few units, which may be separately assembled and then united to form the complete structure. While the forming of the body in units has heretofore been practiced, the particular manner in which the body is subdivided to form the units is, as far as I am aware, entirely novel, as is also the specific construction of the several units.

As shown in Figures 1 to 5, the several units composing the body are; first, a base or sill unit A, which includes both sills, portions of the floor and portions of the side of the body; second, a tonneau unit B, which is engageable with the sill unit and adjoins the portion of the side thereon; third, a front seat unit C, which in addition to the seat includes the door post adjoining the side portion upon said sill unit; fourth, a cowl unit D, which also embodies therein a door post and is complementary to the side finish on the sill unit.

Base unit.

The sill or base unit A is composed of complementary pressed sheet metal side members E and E' having their outer edges conforming to the general contour of the base of the body, while their inner edges are straight and parallel to each other. Adjacent to the inner edges of these members are depending channel-shaped portions $E^2$ formed integral therewith and which rest upon the sills of the vehicle chassis. The inner walls of these channels terminate in inwardly extending flanges $E^3$, which are depressed below the level of the main portion a distance equal to the thickness of the floor boards. The outer edge portion of the members E and E' is formed with the depending flange $E^4$ terminating in an inwardly extending flange $E^5$, the latter being in the plane of the bottom of the channel $E^2$. The flanges $E^4$ and $E^5$ extend the entire length of the members E and E', but all portions thereof are not in alignment. Thus, in the rear the width of the portion $E^6$ of the members E and E' is reduced sufficiently to provide clearance for the tonneau unit, while forward of this reduced portion is the portion $E^7$, which lies flush with the outer face of the tonneau unit at the front, also conforming to the angle thereof. Preferably, the portion $E^7$ is formed of a separate member spot welded or otherwise secured to the main member, and forming a threshold or door sill.

The members E and E' are cross-connected by a rear cross member $E^8$, the rear edge of which conforms to the contour of the tonneau and is provided with depending and inwardly-extending flanges similar to the flanges $E^4$ and $E^5$. The top portion of this member overlaps the top portions of the members E and E', being secured thereto by spot welding or other suitable connection. The members E and E' are further cross-connected by the spaced inverted channel bars $E^9$, the top faces of which are flush with the top faces of the members E and E', while the bottom edges are provided with outwardly-extending flanges $E^{10}$, substantially flush with the flanges $E^3$ and secured thereto by spot welding. These cross members $E^9$ are arranged to register with the front seat C and to form a portion of the support therefor. There is also provided a member $E^{11}$, which extends between the members E and E' resting at its opposite ends upon the flanges $E^3$ thereof and forming a pan or bottom for the space beneath the tonneau seat. The side members E and E' are oppositely formed with portions $E^{12}$, so disposed as to lie substantially beneath the front seat when the latter is properly positioned upon the base unit, said portions rising sufficiently to occupy a flush relation with the floor mat (not shown) when the latter is disposed in front of said seat.

Tonneau unit.

The tonneau unit comprises the back and sides extending forward to the rear door opening and cross-connected by the seat. The back and side panels are suitably fashioned according to the contour desired and at the top are provided with the inturned flanges F return-bent at F' and terminating in the depending flange F². These parts form the top rail or finish, while the upholstery (not shown) may be arranged beneath the return-bent portion and rests against the depending flange F². G is the top iron or member for supporting the canopy top of the vehicle and is formed of a pin or post member G' passing through the side panel of the tonneau. This post is supported by a member G² formed of flat bar stock which is bent to form a diagonal brace G³ extending from the post to the inner face of the wheel housing, which latter is a depressed portion B' in the side of the tonneau B. The member G³ is riveted or otherwise secured to the wheel housing and is secured at its top to the post G' by means of the clamping nut G⁴. Above this point of attachment the member G is bent outward and upward to engage the depending flange F².

The tonneau seat is formed by an apertured frame H, which at its forward end is supported on a heel board H' extending across between the sides and having foot flanges H² for resting upon the members E and E'. At the rear the frame H is supported by Z-brackets H³ which are adapted to rest upon the cross member E⁸. One of these Z-brackets is extended obliquely upward to form a reinforcing bar H⁴, being attached at its upper end to the flange F² and at its center bearing against the outer panel. H⁵ is a tire supporting arm attached to the bar H⁴ and passing through the outer panel. At the base of the sides of the tonneau unit are the inwardly facing channel members H⁶, which are adapted to slide over the portion E⁶ of the members E and E' to engage the units with each other.

Front seat unit.

The front seat unit C is supported upon the cross members E⁹ and comprises a suitably fashioned back panel J, a heel board J' and apertured seat frame J² extending between said heel board and back panel. At the opposite sides of the unit are post members J³, which are attached to the forwardly projecting sides of the back panel and at the bottom are adapted to engage the base unit lying flush with the portions E⁷ thereof. The base unit is further provided with an angle bracket J⁴, the lower flange of which overlies the member E and may be secured thereto by bolting, welding, or other suitable means.

Cowl unit.

This unit is composed of sides K, top K' and front K². The sides have formed at the rear edges thereof post members K³, while in front thereof are the bracket members K⁴ having the inclined flanges for supporting the toe board. The front K² is cut away at K⁵ for the reception of the fuel tank, where the latter is located beneath the cowl.

The several units formed as described may be assembled by sliding the tonneau unit and cowl unit into end-wise engagement with the base unit and by placing the front seat unit in proper registration on top of said base unit. These parts are then secured, preferably by spot-welding, so as to form an integral structure. The base unit is sufficiently stiff, by reason of the channels and outer flanges thereof, so as to form a strong connecting tie between the units when the body is dismounted from the chassis. On the other hand, when the body is placed on the chassis, the channels E² will rest upon the chassis sills L and may be secured thereto by bolts L', reinforcing plates being placed in the channels for engagement with the bolt heads. There is also preferably a shim L³, which is interposed between the channel E² and the chassis sill L, forming a cushion.

What I claim as my invention is:

1. In a vehicle body, a base unit comprising a pair of side sill members having their outer edges conforming to the contour of the body and their inner edges parallel to the longitudinal axis of the body, cross members connecting said sills and forming supports for super-sections of the body, and depressed flanges on the portions of said sills between said cross members for supporting the floor boards.

2. In a vehicle body, a base unit comprising side sills and cross members having their upper faces in the plane of the top of the floor, said cross members having depending flanges with lateral projections for supporting the floor boards.

3. In a vehicle body, a base unit comprising side sills and cross-connecting members with their upper faces in the plane of the top of the floor, said side sills having their outer edges conforming substantially to the contour of the body and their inner edges parallel to the longitudinal axis of the body, and channel portions adjacent to said inner edges for resting upon the sills of the chassis.

4. In a vehicle body, a base unit comprising side sills and cross-connecting members having their upper faces flush with the top of the floor, the outer edges of said sills conforming substantially to the contour of the body and provided with depending and inturned flanges and the inner edges of said sill members being parallel with the longitudinal axis of the body and provided with channel portions for resting upon the chassis sills, the inner walls of said channel portions being provided with laterally inwardly-extending flanges depressed below the upper face of said sills a distance equal to the thickness of the floor boards and forming a support for the latter.

5. In a vehicle body, a base unit comprising side sills having their outer edges conforming to the contour of the body and their inner edges parallel to the longitudinal axis of the body, each of said sills having at its outer edge a depending flange terminating in an inturned flange and at its inner edge being formed with a channel portion terminating in a lateral inturned flange, which is depressed below the face of said sills a distance equal to the thickness of the floor boards, and cross members connecting said side sills with their upper faces substantially flush with the upper faces of the sills, and forming a support for the super-units of the body and also provided with depressed laterally extending flanges for passing beneath the floor boards.

6. In a vehicle body, a base unit comprising side sills having the greater portion of their upper faces flush with the floor, and an embossed portion extending upward equal to the thickness of the floor mat to be flush with the upper face thereof.

7. In a vehicle body, a base having the greater portion of its upper face flush with the floor boards, a seat rising from said base having a curved contour, and an embossed portion on said base adjacent to said seat rising to a height equal to the thickness of the floor mat to be flush with the upper face thereof and forming a straight edge for adjoining said mat.

8. In a vehicle body, a base section comprising sides and cross members having their upper faces substantially flush with the floor and their outer edges conforming to the shape of the body, and a super-unit endwise engageable with said base unit and secured thereto.

9. In a vehicle body, a base unit comprising a pair of longitudinal sills and cross members rigidly connecting said sills, said sills having seats to engage the sills of a chassis and projecting laterally beyond said seats, and a super-unit provided with channeled sides for end-wise engagement with the sills of said base unit and being secured thereto.

10. In a vehicle body, a base unit comprising side sills having their outer edges substantially conforming to the contour of the body and their inner edges parallel to the longitudinal axis of the body, each of said sills having a channel portion at its inner edge for resting on the chassis sills, and means for securing said unit to the chassis engaging said channel portions.

11. In a vehicle body, the combination of a base unit having side sills and cross-connecting members, the upper faces thereof being substantially flush with the top of the floor, threshold or door sill portions on said side sills, a tonneau unit mounted on the rear portion of said base unit and adjoining said threshold portions, a cowl unit independently mounted on the forward portion of said base unit also adjoining said threshold portions, and a front seat unit independently mounted between said cowl and tonneau unit and provided with a door post portion for engaging said threshold portion.

12. In a vehicle body, a tonneau section having side panels and an inwardly embossed portion forming a wheel housing and a top-supporting bracket comprising a bar secured at its lower end to said wheel housing portion and extending obliquely therefrom to the upper portion of the panel to which it is secured to form with said side panel and the top of said housing a triangular truss, and a laterally extending arm from said upper end for supporting the top.

13. In a vehicle body, a tonneau unit including back and side panels and a seat frame extending therebetween, a bar extending obliquely from the back portion of said seat frame to the upper portion of said back panel and secured thereto, and an arm projecting from said bar through said back panel and forming a tire support.

14. In a vehicle body, the combination with a base unit, of a tonneau unit supported thereon comprising side and back panels with a seat frame extending therebetween, a plurality of supporting brackets for the rear edge of said seat frame resting upon said base unit, one of said supports being extended upward obliquely crossing the center of said back panel and attached thereto at its upper end, and an arm extending centrally from said bar through said back panel and forming a tire support.

15. In a vehicle body, the combination with a base unit, of a front seat unit extending across said base unit, the width thereof being less than the width of the base, and door posts projecting outward from said seat unit with their outer faces flush with the outer edges of said base.

16. In a vehicle body, the combination with a base unit formed of sheet metal having seats to engage the chassis sills and laterally extending beyond said seats, of a tonneau unit endwise engageable with said base unit and comprising a back, sides and a seat portion, said sides having their lower edges inwardly flanged for engagement beneath said base unit.

17. In a vehicle body, the combination with a base unit comprising side sills and a rear cross sill, of a tonneau unit having an endwise slidable engagement with said base unit and comprising a back, sides and a seat frame, a heel board for supporting a forward end of said seat frame upon said base unit, and means carried by said cross sill of the base supporting the rear end of the seat frame.

18. A sill for vehicle bodies including a sheet having a longitudinally extending channel-shaped portion at its inner edge, and a depending flange at its outer edge, the outer wall of the channel portion having a lateral projection for supporting suitable floor boards, and said depending flange having an inward extension disposed substantially in the plane of the base of the channel portion.

19. In a vehicle body, a sill including a sheet having a longitudinally extending channel-shaped portion at its inner edge, and a depending flange at its outer edge, said flange having an inward extension, the outer wall of said channel having a lateral extension for supporting floor boards, a panel secured to said sheet, and a separate threshold member secured to said panel and inward extension of said depending flange.

20. In a vehicle body, the combination with a panel having a depressed portion constituting a wheel housing, an inwardly extending flange constituting the top rail, and a brace secured to the inner face of the depressed portion and having a portion engaging the inwardly extending flange aforesaid.

21. In a vehicle body, the combination with a panel having a depressed portion constituting a wheel housing, an inwardly extending flange constituting the top rail having a depending portion, and a brace secured to the inner face of the depressed portion, secured to the inner face of the panel and having a portion engaging the depending portion of the inwardly extending flange.

In testimony whereof I affix my signature.

PAUL E. BRENEMAN.